United States Patent
Hahn et al.

(10) Patent No.: US 8,738,913 B2
(45) Date of Patent: May 27, 2014

(54) METHOD OF DERIVING AND UPDATING TRAFFIC ENCRYPTION KEY

(75) Inventors: Gene Beck Hahn, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 755 days.

(21) Appl. No.: 12/477,848

(22) Filed: Jun. 3, 2009

(65) Prior Publication Data

US 2009/0307496 A1 Dec. 10, 2009

Related U.S. Application Data

(60) Provisional application No. 61/058,220, filed on Jun. 3, 2008.

(30) Foreign Application Priority Data

Sep. 9, 2008 (KR) .................. 10-2008-0088793
Nov. 21, 2008 (KR) .................. 10-2008-0116367

(51) Int. Cl.
*H04L 29/06* (2006.01)
*H04L 9/08* (2006.01)

(52) U.S. Cl.
CPC ............ *H04L 63/06* (2013.01); *H04L 63/0428* (2013.01); *H04L 63/083* (2013.01); *H04L 9/0891* (2013.01); *H04L 2209/80* (2013.01)
USPC ............. 713/171; 713/170; 380/33; 380/272; 370/331; 370/469; 455/436

(58) Field of Classification Search
CPC . H04L 2209/80; H04L 63/0428; H04L 63/06; H04L 63/083; H04L 9/0891; H04L 9/0844
USPC ........................................................... 713/171
See application file for complete search history.

(56) References Cited

U.S. PATENT DOCUMENTS

2003/0099362 A1* 5/2003 Rollins .................. 380/278
2006/0285519 A1* 12/2006 Narayanan et al. ........... 370/331
2009/0274302 A1* 11/2009 Wu et al. ....................... 380/272

FOREIGN PATENT DOCUMENTS

| KR | 10-0704678 | 4/2007 |
| KR | 10-2007-0101504 | 10/2007 |
| KR | 10-2008-0024882 | 3/2008 |
| KR | 10-2008-0033763 | 4/2008 |

OTHER PUBLICATIONS

IEEE Draft Standard for Local and Metropolitan Area Networks. Part 16: Air Interface for Broadband Wireless Access Systems. IEEE Wireless Manual 802.16. Apr. 2008. New York, NY.*

(Continued)

*Primary Examiner* — Thanhnga B Truong
*Assistant Examiner* — Narciso Victoria
(74) *Attorney, Agent, or Firm* — Lee, Hong, Degerman, Kang & Waimey

(57) ABSTRACT

A method for efficiently deriving a traffic encryption key for data encryption is disclosed. A method of generating a traffic encryption key (TEK) comprises the steps of receiving, by a mobile station from base station, a first nonce and first security materials for deriving the traffic encryption key (TEK) and deriving the traffic encryption key (TEK) using one or more of the first nonce, the authentication key (AK), and the first security materials.

5 Claims, 7 Drawing Sheets

(56) References Cited

OTHER PUBLICATIONS

Junbeom Hur et al. "Security Consideration for Handover Schemes in Mobile WiMAX Networks." IEEE Wireless Communications and Networking Conference, 2008 (WCNC 2008), pp. 2531-2536.*

Semyon B Mizikovsky et al., "TEK Generation and Update for Efficient Secure Handoff", IEEE 802.16 Broadband Wireless Access Working Group, IEEE C802.16maint-08/107r4, May 2008, 14 pages.

LAN/MAN Standards Committee et al., "IEEE Standard for Local and metropolitan area networks", Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEEStd 802.16e-2005 and IEEEStd 802.16-2004/Cor1-2005, Nov. and Dec. 2005, 52 pages.

Genebeck Hahn et al., "TEK Management for IEEE 802.16m", IEEE 802.16 Broadband Wireless Access Working Group, IEEE C802.16m_08/988, Sep. 2008, 4 pages.

The Institute of Electrical and Electronics Engineers (IEEE), "Part 16: Air Interface for Fixed and Mobile Broadband Wireless Access Systems; Amendment 2: Physical and Medium Access Control Layers for Combined Fixed and Mobile Operation in Licensed Bands and Corrigendum 1," IEEE Std 802.16e™-2005 and IEEE Std 802.16™-2004/Cor Jan. 2005, Feb. 2006, 864 pages.

The State Intellectual Property Office of the People's Republic of China Application Serial No. 200980129493.6, Office Action dated Apr. 9, 2013, 6 pages.

* cited by examiner

METHOD OF DERIVING AND UPDATING TRAFFIC ENCRYPTION KEY

CROSS-REFERENCE TO RELATED APPLICATIONS

This application claims the benefit of earlier filing date and right of priority to the Korean Patent Application Nos. 10-2008-0088793, filed on Sep. 9, 2008, and 10-2008-0116367, filed on Nov. 21, 2008, which are hereby incorporated by reference as if fully set forth herein, and also claims the benefit of U.S. Provisional Application Ser. No. 61/058,220, filed on Jun. 3, 2008, the contents of which are hereby incorporated by reference herein in their entirety.

This application also claims the benefit of U.S. Provisional Application Ser. No. 60/058,220, filed on Jun. 3, 2008 the contents of which are hereby incorporated by reference herein in their entirety.

BACKGROUND OF THE INVENTION

1. Field of the Invention

The present invention relates to a method of encrypting data when transmitting and receiving the data in a wireless access system, and more particularly, to a method of generating an efficient traffic encryption key for encryption.

2. Discussion of the Related Art

Hereinafter, a security sublayer used for data communication will be described in brief.

A security sublayer provides a mobile station (MS) and/or a base station (BS) with security, authentication and confidentiality in a broadband wireless network. To support these functions, an encryption function can be applied to the security sublayer, wherein the encryption function is for a medium access control protocol data unit (MAC PDU) transferred between the mobile station and the base station. Therefore, the base station or the mobile station can provide a powerful defense capability against a service theft attack of an illegal user. The base station performs encryption on a service flow (SF) across a network to prevent an illegal user from accessing a data transfer service without any authority. The security sublayer adds a digital certificate based mobile station device authentication to a key management protocol of an authenticated client/server structure, thereby reinforcing a function of a basic security mechanism.

While a basic function negotiation of the mobile station is in progress between the base station and the mobile station, if the mobile station does not support a security function, authentication and key exchange procedures are skipped. Moreover, even if a specific mobile station is registered as a mobile station incapable of supporting an authentication function, a base station can regard that authority of the mobile station is verified. If the specific mobile station does not support a security function, no service is provided to the corresponding mobile station, whereby a key exchange or a data encryption function is not performed.

A protocol structure of the security sublayer includes an encapsulation protocol and a privacy key management (PKM) protocol.

The encapsulation protocol is the protocol for security of packet data in a broadband wireless network. The encapsulation protocol defines a set of cryptographic suites such as data encryption and data authentication algorithms and a method of applying such algorithms to a MAC PDU payload. The cryptographic suites mean a set of security associations (SA) representing algorithms for data encryption, data authentication and traffic encryption key exchange.

The privacy key management protocol (PKM) is the protocol providing a method of safely distributing key relevant data from a base station to a mobile station. If the PKM protocol is used, key relevant data can be shared between the mobile station and the base station. And, the base station can control a network access of the mobile station.

Protection of a unicast data service defined in the IEEE 802.16 standard which is one of wireless access systems means cryptological conversion of MAC protocol data units (MPDUs) transmitted and received between the mobile station and the base station. Encryption which is one of functions of security sublayers for MAC layer is performed by a traffic data encryption layer.

Encryption is applied to the MAC PDU payload requested by a selected ciphersuite. Generally, the mobile station and the base station need a key to perform encryption. Accordingly, in the IEEE 802.16 standard, a traffic encryption key (TEK) is defined. The TEK is generated as a random number by the base station. The base station can transfer an encrypted TEK to the mobile station through a corresponding TEK encryption algorithm.

SUMMARY OF THE INVENTION

A data service flow through a broadband wireless access network has a series of quality of service (QoS) parameters, and encryption and decryption are performed through a traffic encryption key (TEK). The IEEE 802.16 standard which supports one of broadband wireless access systems defines a traffic encryption key (TEK) to protect a unicast data service.

Generally, TEK update for a mobile station which performs handoff is defined by a mechanism where the mobile station receives a ranging response (RNG-RSP) message from a target base station, updates a TEK from the ranging response (RNG-RSP) message, and receives a data service.

However, a method of generating and updating a key for ensuring continuity of a real-time service for a mobile station is not considered. Also, a method of generating a TEK and a method of updating a TEK, which can be used flexibly for a network operation such as handoff (or, handover), are not defined definitely. In other words, in the IEEE 802.16 standard, since a method of generating a TEK during initial network access and a method of updating a TEK during handoff are defined differently, it is required to define these methods coherently. For example, when a mobile station performs handoff from a serving base station to a target base station, the mobile station can update a TEK only when receiving the ranging response (RNG-RSP) message from the target base station, whereby the mobile station cannot transmit and receive encrypted data until it receives the RNG-RSP message. This could lead to damage of service continuity and may result in that a user is not satisfied with QoS.

Accordingly, the present invention is directed to method of generating and updating a traffic encryption key, which substantially obviates one or more of the problems due to limitations and disadvantages of the related art.

An object of the present invention is to provide a method of transmitting data efficiently while maintaining confidentiality.

Another object of the present invention is to provide a method of generating an optimized TEK and updating the TEK to reduce throughput deterioration in generation of initial TEK and TEK update for handoff when a mobile station enters a network. This is a unified method that can commonly be applied to a network entry procedure and a network reentry procedure such as handoff (handover), wherein AK generated as a result of authentication (or re-authentication) and NONCE generated randomly by a base station are used.

Still another object of the present invention is to provide a seamless data service without affecting service quality as a mobile station which performs handoff flexibly acquires updated TEK.

Further still another object of the present invention is to provide a method of acquiring an authentication key (AK) to be used by a target base station and previously generating a TEK to be used by the target base station in a mobile station and the target base station through the AK and previously generated NONCE, before the mobile station performs handoff. In this case, NONCE can be reused as far as a lifetime of NONCE, which is used to generate a TEK in a serving base station before handoff is performed, does not expire.

It is to be understood that the technical problems to be achieved by the present invention are not limited to the aforementioned problems and other technical problems which are not mentioned will be apparent from the following description to the person with an ordinary skill in the art to which the present invention pertains.

To achieve these and other advantages and in accordance with the purpose of the present invention, as embodied and broadly described, the embodiments of the present invention disclose a method of encrypting data when transmitting and receiving the data in a wireless access system. Particularly, the embodiments of the present invention disclose a method of generating a traffic encryption key efficient for encryption.

In one aspect of the present invention, a method of generating a traffic encryption key (TEK) comprises the steps of obtaining a key parameter during an authentication procedure with a base station; deriving the authentication key (AK) using the key parameter; receiving, by a mobile station from the base station, a first nonce and first security materials for deriving the traffic encryption key (TEK); and deriving the traffic encryption key (TEK) using one or more of the first nonce, the authentication key (AK), and the first security materials.

Preferably, the first security materials comprise at least one of a first key count, a security association identifier (SAID), the base station identifier (BSID) and a medium access control address of the mobile station (MS MAC address). Also, the nonce is generated using a random number generator by the base station.

The key parameter includes one or more of a pre-authentication key (PAK), a pair-wise master key (PMK), and a pair-wise master key2 (PMK2).

In one aspect of the present invention, the method further comprises the step of performing handover to a target base station after the steps are all performed.

The nonce is transferred from the base station to the mobile station during authentication (or re-authentication), when the mobile station performs location update from an idle mode, or when the mobile station requests key update. The base station transfers one NONCE to the mobile station during authentication (or re-authentication) and location update. The base station transfers two nonces (old nonce/new nonce) to the mobile station during key update. Namely, the base station should maintain two nonces for specific SAID.

Preferably, the traffic encryption key is updated during handover, and increases or is reset whenever the nonce is refreshed. Namely, the traffic encryption key counter increases whenever the TEK is updated. This is to allow the same key count not to be used when a new key is generated.

The method further comprises the step of deriving a cipher-based message authentication code (CMAC) key using at least one of the authentication key (AK) and the first key count.

In one aspect of the present invention, if the traffic encryption key counter is set to a null value, an initial TEK is generated.

In one aspect of the present invention, the method further comprising the step of exchanging a second nonce and second security materials; and deriving at least one of a traffic encryption key (TEK) and a cipher-based message authentication code (CMAC) key using at least one of the authentication key (AK), the second nonce and the second security materials.

Preferably, the second security materials comprise at least one of a second key count, the security association identifier (SAID), the base station identifier (BSID) and a medium access control address of the mobile station (MS MAC address).

In one aspect of the present invention, the method further comprises the step of performing handover to a target base station after the steps are all performed.

In another aspect of the present invention, a method of generating a traffic encryption key (TEK) comprises the steps of transmitting a parameter for generating an authentication key (AK) to a mobile station through an authentication procedure with the mobile station; generating the authentication key using the parameter and base station identifier; receiving nonce for generating the traffic encryption key; and generating the traffic encryption key using one or more of the authentication key, the nonce, a traffic encryption key (TEK) counter, and security association identifier (SAID).

The nonce is the same as that transmitted from the base station to the mobile station. Also, the nonce is generated using a random number generator by the base station. The parameter includes one or more of a pre-authentication key (PAK), a pair-wise master key (PMK), and a pair-wise master key2 (PMK2). Also, the traffic encryption key is updated during handover, and increases or is reset whenever the nonce is refreshed. Namely, the traffic encryption key counter increases whenever the TEK is updated.

The method further comprises the step of performing handover to a target base station after the steps are all performed.

In still another aspect of the present invention, a method of generating a traffic encryption key (TEK) comprises the steps of receiving a parameter for generating an authentication key (AK) from a serving base station; generating the authentication key using the parameter; receiving nonce for generating the traffic encryption key from the serving base station; and generating the traffic encryptionkey using one or more of the nonce, the authentication key, a traffic encryption key (TEK) counter, and security association identifier (SAID).

In further still another aspect of the present invention, a method of generating a traffic encryption key (TEK) comprises the steps of generating an authentication key (AK) for generating a traffic encryption key (TEK) from a base station; receiving a parameter including nonce for generating the traffic encryption key from the base station; and generating the traffic encryptionkey using one or more of the nonce, the authentication key, a traffic encryption key (TEK) counter, and base station identifier, a media access control (MAC) address of a mobile station, and security association identifier (SAID).

Also, the nonce is generated using a random number generator by the base station. The parameter includes one or more of a pre-authentication key (PAK), a pair-wise master key (PMK), and a pair-wise master key2 (PMK2). The nonce is transferred from the base station to the mobile station during authentication (or re-authentication), when the mobile station performs location update from an idle mode, or when the mobile station requests key update.

In further still another aspect of the present invention, a method of deriving a traffic encryption key (TEK) comprises transmitting a key parameter for deriving an authentication key (AK) to the mobile station through an authentication procedure with the mobile station; deriving the authentication key using the key parameter and a base station identifier; transmitting a nonce and security materials for deriving the traffic encryption key; and deriving the traffic encryption key using one or more of the authentication key (AK), the nonce, and the security materials.

Preferably, the security materials comprises at least one of a key count, a security association identifier (SAID), the base station identifier and a medium access address of the mobile station (MS MAC address). Also, The nonce is the same as that transmitted from the base station to the mobile station. In this case the nonce is generated by the base station.

Preferably, the key parameter includes one or more of a pre-authentication key (PAK), a pair-wise master key (PMK), and a pair-wise master key2 (PMK2).

In further still another aspect of the present invention, the method further comprises deriving a cipher-based message authentication code (CMAC) key using at least one of the authentication key (AK) and the key count; exchanging a second nonce and second security materials; and deriving at least one of a traffic encryption key (TEK) and a cipher-based message authentication code (CMAC) key using at least one of the authentication key (AK), a nonce and security materials.

Preferably, the second security materials comprise at least one of a second key count, the security association identifier (SAID), the base station identifier (BSID) and a medium access control address of the mobile station (MS MAC address).

According to the embodiments of the present invention, the following effects and/or advantages can be obtained.

First of all, it is possible to efficiently transmit and receive data with confidentiality without latency.

Second, a mobile station can provide or be provided with a seamless data service while security is maintained during handoff.

Third, if a mobile station which performs handover receives a unicast data service, the mobile station can efficiently generate a TEK for protecting data.

Fourth, since a mobile station and a target base station generate a TEK previously before performing handover, the mobile station can quickly receive an encrypted data service from the target base station during and after handover.

Fifth, as the embodiments of the present invention are used, it is possible to provide a multimedia streaming service, which requires QoS of high level, without seamlessness.

Finally, it is possible to support a method of generating and updating a TEK, which can commonly be applied to an initial network entry procedure and a handoff procedure.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
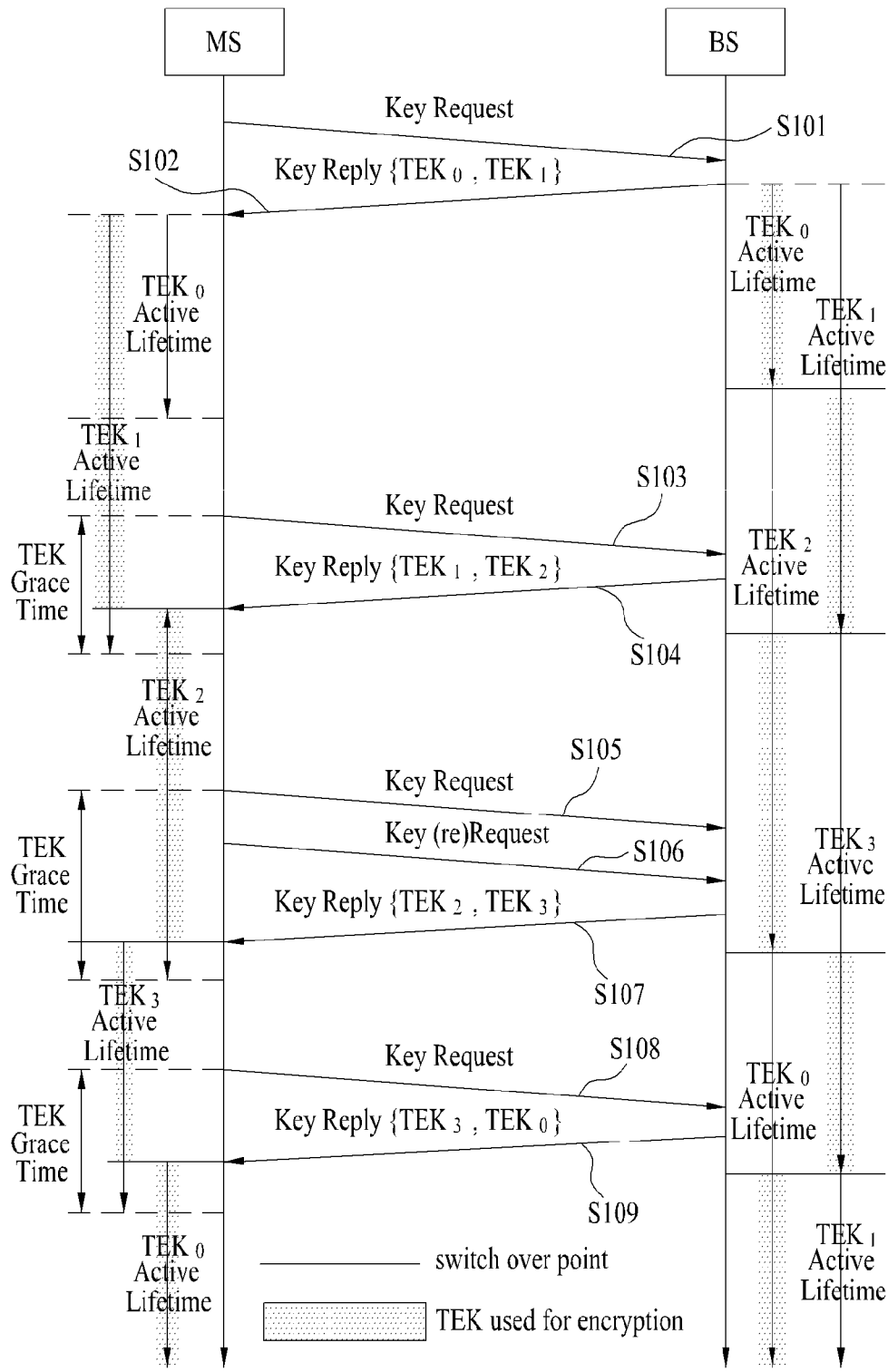
FIG. 1 is a diagram illustrating a method of exchanging a TEK between a base station and a mobile station.

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The following description provides specific details for a thorough understanding of embodiments of the invention. However, one skilled in the art will understand that the invention may be practiced without these details. In other instances, well-known structures and functions have not been described in detail or may be shown in block diagram form to avoid unnecessarily obscuring the description of embodiments of the invention. Wherever possible, the same reference numbers will be used throughout the drawings to refer to the same or like parts.

The present invention relates a wireless access system. The present invention discloses a method of encrypting data when transmitting and receiving the data in a wireless access system and a method of generating a traffic encryption key.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), an advanced base station (ABS) and access point. Also, the mobile station may be replaced with terms such as a user equipment (UE), a subscriber station (SS), a mobile subscriber station (MSS), mobile terminal (MT), an advanced mobile station (AMS) and a terminal.

Furthermore, a transmitter means a fixed and/or mobile node that transmits data service or voice service, and a receiver means a fixed and/or mobile node that receives data service or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, and a mobile broadband system (MBS) phone.

The embodiments according to the present invention can be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

FIG. 1 is a diagram illustrating a method of exchanging a TEK between a base station and a mobile station.

The base station (BS) generates a TEK using a random number. Also, the base station guides a key encryption key (KEK) from an authentication key (AK). After encrypting the TEK using the KEK, the base station can transmit the encrypted TEK to the mobile station (MS).

Table 1 illustrates a method of generating a TEK.

TABLE 1

| Key Type | Derivation Method |
|---|---|
| AK | If (PAK and PMK)<br>    AK<= Dot16FKDF (PAK $\oplus$ PMK, SS MAC Address \| BSID \| PAK \| "AK", 160)<br>Else if (PMK and PMK2)<br>    AK<= Dot16KDF (PMK $\oplus$ PMK2, SS MAC Address \| BSID \| "AK", 160)<br>Else<br>    If(PAK)<br>        AK<= Dot16KDF (PAK, SS MAC Address \| BSID \| PAK \| "AK", 160)<br>    Else<br>        AK<= Dot16KDF (PMK, SS MAC Address \| BSID \| "AK", 160)<br>    Endif<br>Endif |
| CMAC Key, KEK | CMAC_Key_U \| CMAC_Key_D \| KEK<=Dot16KDF(AK, SS MAC Address \| BSID \| "CMAC_KEYS+KEK", 384)<br>CMAC_Key_GD \| KEK<=Dot16KDF(GKEK, "GROUP CMAC KEK", 128)<br>(used for multicast MAC message such as a PKMv2 Group-Key-Update-commend message) |
| HMAC Key, KEK | HMAC_Key_U \| HMAC_Key_D \| KEK<=Dot16KDF(AK, SS MAC Address \| BSID \| "HMAC_KEYS+KEK", 448)<br>HMAC_Key_GD \| KEK<=Dot16KDF(GKEK, "GROUP CMAC KEK", 160)(used for multicast MAC message such as a PKMv2 Group-Key-Update-commend message) |
| TEK | TEK is generated as a random number in the BS and is encrypted using the corresponding TEK encryption algorithm (e.g. AES key wrap for the SAs with TEK encryption algorithm identifier in the cryptographic suite is equal to 0x04), keyed with the KEK and transferred between BS and SS in the TEK exchange. |

Referring to Table 1, the authentication key (AK) can be generated using one or more of PAK, PMK and PMK2. Also, the CMAC key and the HMAC key can be generated using MAC address of the mobile station and base station identifier (BS ID). Moreover, the base station can generate a TEK using a random number and encrypt the TEK using a KEK.

The mobile station drives a TEK state machine independent for each security association identifier (SAID) received through an authentication response message after an authentication procedure with the base station is completed. The TEK state machine operated inside the mobile station manages key information related to each SAID. The mobile station periodically transmits a key request message to the base station to request key information update for each SAID (S101).

The base station transmits a key response message to the mobile station in response to the key request message, wherein the key response message includes key information of an active mode corresponding to specific SAID. At this time, the key response message includes traffic encryption keys TEK0 and TEK1, a CBC initialization vector, and active lifetime information of traffic encryption keys (S102).

In the step S102, the base station can manage two kinds of active lifetime information per SAID. The active lifetime for the two kinds of active lifetime information is activated only for a half of a lifetime of previous key information in each key information, and overlap can be made in the two kinds of active lifetime information in such a manner that the active lifetime expires over a half of a lifetime of new key information. At this time, the key response message can include active key information corresponding to SAID.

Referring to FIG. 1, the base station manages lifetimes of TEK0 and TEK1. In this case, the lifetime of TEK1 is longer than that of TEK0, and the mobile station can request the base station of a new TEK before the lifetime of TEK1 expires. Accordingly, the mobile station transmits a request message (e.g. Key Request) requesting updated TEK information to the base station (S103).

The base station transmits a key response message (e.g. Key Reply) to the mobile station in response to the step S103, wherein the key response message includes key information (for example, TEK1 and TEK2) of an active mode (S104).

Referring to FIG. 1, key information can be exchanged between the mobile station and the base station in such a manner that the mobile station transmits a key request message to the base station, and the base station transmits a key response message, which includes activated key information, to the mobile station (S105 to S109).

Figure 2:
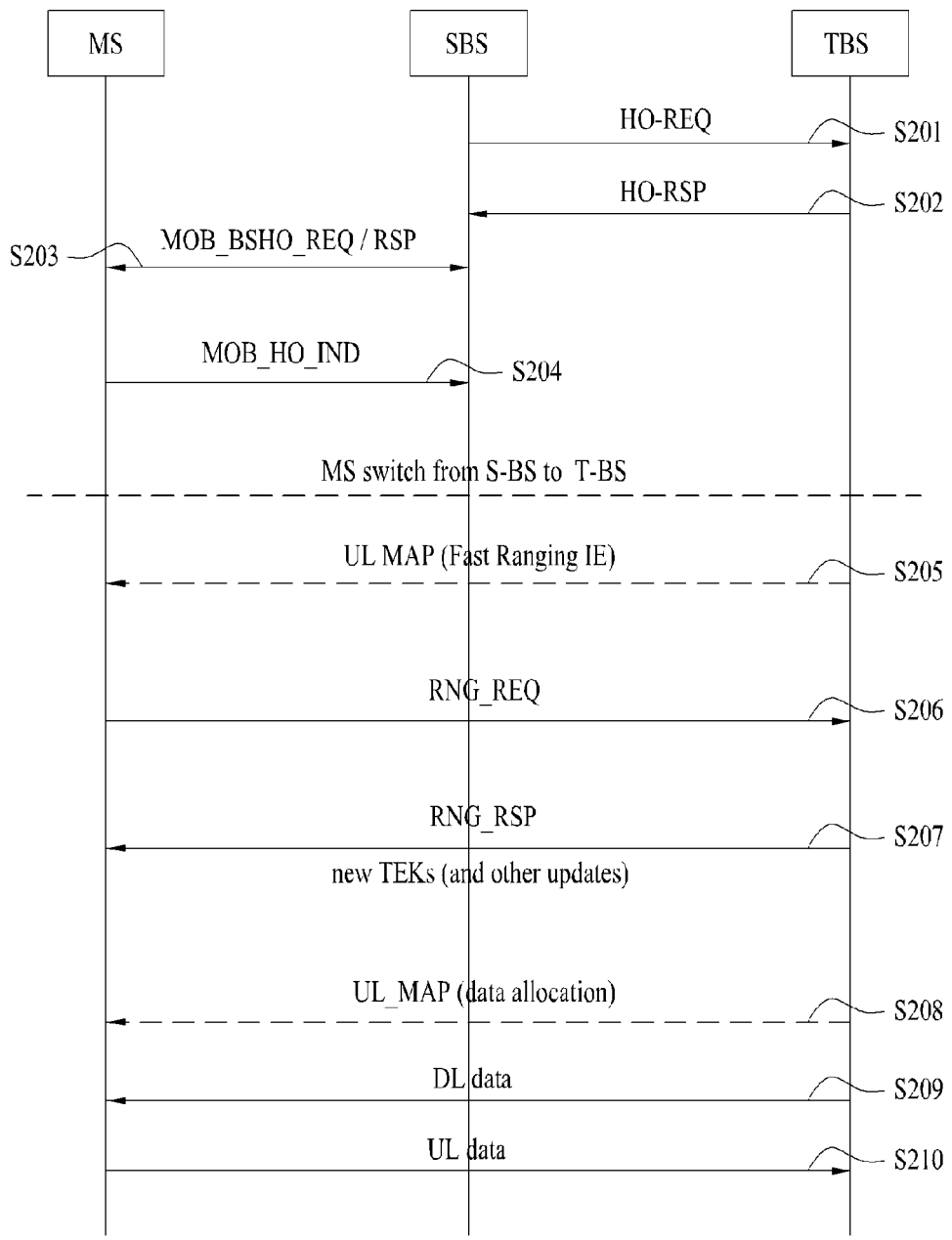
FIG. 2 is a diagram illustrating a method of updating new key information from a target base station when a mobile station performs handover.

FIG. 2 is a diagram illustrating a method of updating new key information from a target base station when a mobile station performs handover.

FIG. 2 illustrates a method of requesting a mobile station of handover by a serving base station (SBS). Namely, the serving base station can transmit a handover request (HO-REQ) message to a target base station (TBS), if necessary, even in case of an unsolicited handover request from the mobile station (S201).

The target base station transmits a handover response (HO-RSP) message to the serving base station in response to the handover request message (S202).

The serving base station requests the mobile station (MS) of handover (MOB_BSHO_REQ), and can receive a handover response message (MOB_MSHO_RSP) in response to the request (S203).

If a condition for handover is satisfied, the mobile station transmits a handover indication message MOB_HO_IND to the base station to notify the base station that handover will be performed (S204).

The mobile station can switch a service base station from the serving base station to the target base station in accordance with the condition for handover.

The target base station transmits an uplink map (UL-MAP) to the mobile station for initial ranging, wherein the uplink map includes a fast ranging information element (e.g. Fast Ranging IE) (S205).

The mobile station transmits a ranging request (RNG-REQ) message to the target base station through an uplink resource by using the fast ranging information element (S206).

The target base station transmits a ranging response (RNG-RSP) message to the mobile station, wherein ranging response message includes information relevant to ranging and a TEK used in the target base station (S207).

The target base station allocates the uplink resource to the mobile station by transmitting an uplink map message to the mobile station, wherein the uplink map message includes scheduling information of the uplink resources (S208).

Also, the target base station encrypts downlink data using the TEK transmitted to the mobile station in step S207, and transmits the encrypted downlink data to the mobile station (S209).

Furthermore, the mobile station encrypts uplink data using the TEK received in step S207, and transmits the encrypted uplink data to the target base station (S210).

Referring to FIG. 1 and FIG. 2, the mobile station can update the TEK after receiving the ranging response (RNG-RSP) message from the target base station during handover. Accordingly, since the mobile station fails to process the encrypted data before receiving the ranging response (RNG-RSP) message after completing handover, problems of data latency and overhead may occur.

For example, the mobile station cannot recover data during handover until the mobile station receives the ranging response (RNG-RSP) message from the target base station. The mobile station can recover the data only when acquiring the updated TEK included in the ranging response (RNG-RSP) message. For this reason, latency in providing a real-time service may be caused.

Also, a radio frequency status is not good relatively while handover is being performed. Under the circumstances, if TEK update of 128 bits is performed, a waste may be caused in view of over-the-air (OTA) resources, and the TEK update may act as overhead in the system.

In the embodiments of the present invention, a method of generating an initial TEK using an authentication key (AK) of a corresponding mobile station is disclosed. Likewise, even in the case that the TEK is updated for a mobile station which performs handoff, the TEK can be generated using the AK. In this way, if a new method of generating and updating a TEK is adopted, a procedure of updating a TEK during handoff or latency can be reduced. Accordingly, damage of continuity or deterioration of service quality can be reduced in actually providing a data service.

In the embodiments of the present invention, the target base station and/or the mobile station can generate a TEK using an AK shared by them. Accordingly, the mobile station does not need to separately request or receive a TEK after handover to the target base station.

The following Equation 1 represents an example of a method of generating a TEK, which can be used in the embodiments of the present invention.

[Equation 1]

$$(Old,New)TEK = Dot16KDF(AK,(Old,New)\ Nonce|SAID|\text{"TEK"},128)$$

In the Equation 1, new TEK and old TEK represent TEKs generated during an initial network entry procedure of the mobile station or a location update procedure of the mobile station. At this time, the mobile station and the base station can use an AK, Nonce, and SAID when generating a TEK.

Referring to the Equation 1, in the embodiments of the present invention, the AK is used when the TEK is generated. This method is different from a general method of generating a TEK using a random number in a base station. The reason that an AK is used in generating a TEK is to allow the base station and the mobile station to flexibly and efficiently process a network operation such as handoff and support a unified method of generating and updating a TEK.

Furthermore, the reasons that an AK is used in generating a TEK are as follows. When a general key is generated, identifier of a specific mobile station or base station is included in the key, whereby the specific mobile station is associated with the specific base station. Accordingly, if the mobile station and/or the base station generates a key (for example, TEK) using an AK, since the AK is already associated with the specific base station and the specific mobile station, the identifier of the mobile station or the base station may not be included in the key when the key is generated.

Furthermore, since it is required that a TEK differentiated for each security association is generated and updated, security association identifier (SAID) is used in generating a TEK.

In the embodiments of the present invention, a PKMv3 key nonce request/reply (PKMv2 Key-Nonce-Request/PKMv2 Key-Nonce-Reply) messages or a PKMv3 3-Way Handshake message can be used when a TEK is generated. Namely, the base station can transmit Nonce for generating a TEK instead of the TEK itself to the mobile station by using the PKMv3 key nonce reply message or a PKMv3 SA_TEK-Response message. The mobile station can generate a TEK as expressed by the Equation 1 by receiving Nonce.

Since the radio frequency condition is not good during handoff, a procedure of exchanging a TEK to generate the TEK needs more OTA (Over the Air) resources. Accordingly, a problem occurs in that high overhead may occur in the procedure of exchanging a TEK. To solve this problem, the base station transmits Nonce of 4 bits to 8 bits or 8 bits to 16 bits to the mobile station without directly transmitting a TEK of 128 bits, whereby message overhead can be reduced.

The following Table 2 illustrates an example of a PKM message code used in the embodiments of the present invention.

TABLE 2

| Code | PKM Message Type | MAC Management Message Type |
|---|---|---|
| ... | ... | ... |
| 33 | MIH comeback Response | PKM-RSP |
| 34 | PKMv3 Key-Nonce-Request | PKM-REQ |
| 35 | PKMv3 Key-Nonce-Reply | PKM-RSP |
| 36-255 | Reserved | — |

In the embodiments of the present invention, the PKMv3 key nonce request/reply messages can be used. Although the PKMv3 key nonce request/reply messages do not include a TEK actually, the PKMv3 key nonce request/reply messages may include a nonce value for generating a TEK.

The following Table 3 illustrates an example of a PKM attribute type that can be used in the embodiments of the present invention.

TABLE 3

| Type | PKM attribute |
|---|---|
| ... | ... |
| 35 | Encrypted pre-PAK |
| 36 | Nonce |
| 37 | TEK Nonce |
| 38-255 | reserved |

Referring to Table 3, type numbers 36 and 37 for use in the embodiments of the present invention are added to the existing PKM attribute type to define nonce and TEK nonce.

The following Table 4 illustrates an example of TEK encryption algorithm identifiers used in the embodiments of the present invention.

TABLE 4

| Value | Description |
|---|---|
| 0 | reserved |
| 1 | 3-DES EDE with 128-bit key |
| 2 | RSA with 1024 bit key |
| 3 | ECB mode AES with 128 bit key |
| 4 | AES key wrap with 128 bit key |
| 5 | Derive TEKs with TEK Nonce |
| 6-255 | Reserved |

Referring to Table 4, for the embodiments of the present invention, 'Derive TEKs with TEK Nonce' identifier is additionally provided. Namely, if the identifier of the TEK encryption algorithm is set to 5, the mobile station and the target base station can generate and/or update the TEK from the nonce shared between them.

The following Table 5 illustrates an example of security association TEK update TLV (SA-TEK-Update TLV) that can be used in the embodiments of the present invention.

TABLE 5

| Name | Type | Length | Value |
|---|---|---|---|
| SA-TEK-Update-Type | 142.1 | 1 | TEK parameters for an SA 2: GTEK parameters for a GSA 3-255: Reserved |
| New SAID | 142.2 | 2 | New SAID after handover to new BS |
| Old TEK/GTEK-parameters | 142.3 | variable | "Older" generation of key parameters relevant to (G)SAID. The compound fields contain the sub-attributes as defined in table 559. |
| New TEK/GTEK-parameters | 142.4 | variable | "New" generation of key parameters relevant to (G)SAID. The compound fields contain the sub-attributes as defined in table 559. |
| GKEK-Parameters | 142.5 | variable | GKEK, its lifetime, and its sequence number for the corresponding, GSAID |
| Old TEK Nonces | 142.6 | variable | "Older" generation of key parameters relevant to SAID. The compound fields contain the sub-attributes as defined in the "TEK-Nonces Subattributes" table. |
| New TEK Nonces | 142.7 | variable | "Newer" generation of key parameters relevant to SAID. The compound fields contain the sub-attributes as defined in the "TEK-Nonces Subattributes" table. |

Table 5 represents values of SA-TEK-Update TLV used for update of the TEK. If handoff occurs, security association (SA) activated in a previous base station includes TEK, GTEK and/or GKEK parameters. The SA-TEK-Update TLV is used by the mobile station to update active SA used in the previous base station. Also, the TLV values include new SAID to be used by the target base station, and old TEK parameters and new TEK parameters corresponding to SAID, wherein new SAID substitutes for the active SAID used in the previous base station. As described above, old or new TEK NONCE values used even after handoff is performed are NONCEs allocated from the serving base station before handoff is performed.

Furthermore, the SA-TEK-Update TLV includes GTEK parameters relevant to multicast/broadcast group SAIDs (GSAIDs). If the TEK is generated in the base station and the mobile station, TEK-Nonces can substitute for TEK-Parameters. A "New SAID" field represents SAID allocated by a new base station, and mapping between new SAID and SAID allocated by the previous base station is controlled by SAID Update TLV.

The following Table 6 illustrates an example of a handover process optimization TLV value.

to protect TEK nonce. Namely, the TEK encryption algorithm is used when the TEK nonce is transmitted, whereby safe TEK nonce encrypted with KEK is transmitted.

Option C is as follows. If the SA-TEK-Update TLV is included in the SA-TEK response (SA-TEK-Response) message, SA-TEK 3-way Handshake can be performed by the SA challenge Tuple TLV included in the ranging response message.

In the embodiments of the present invention, the mobile station and/or the base station can generate a TEK using option A or option B, preferably.

Figure 3:
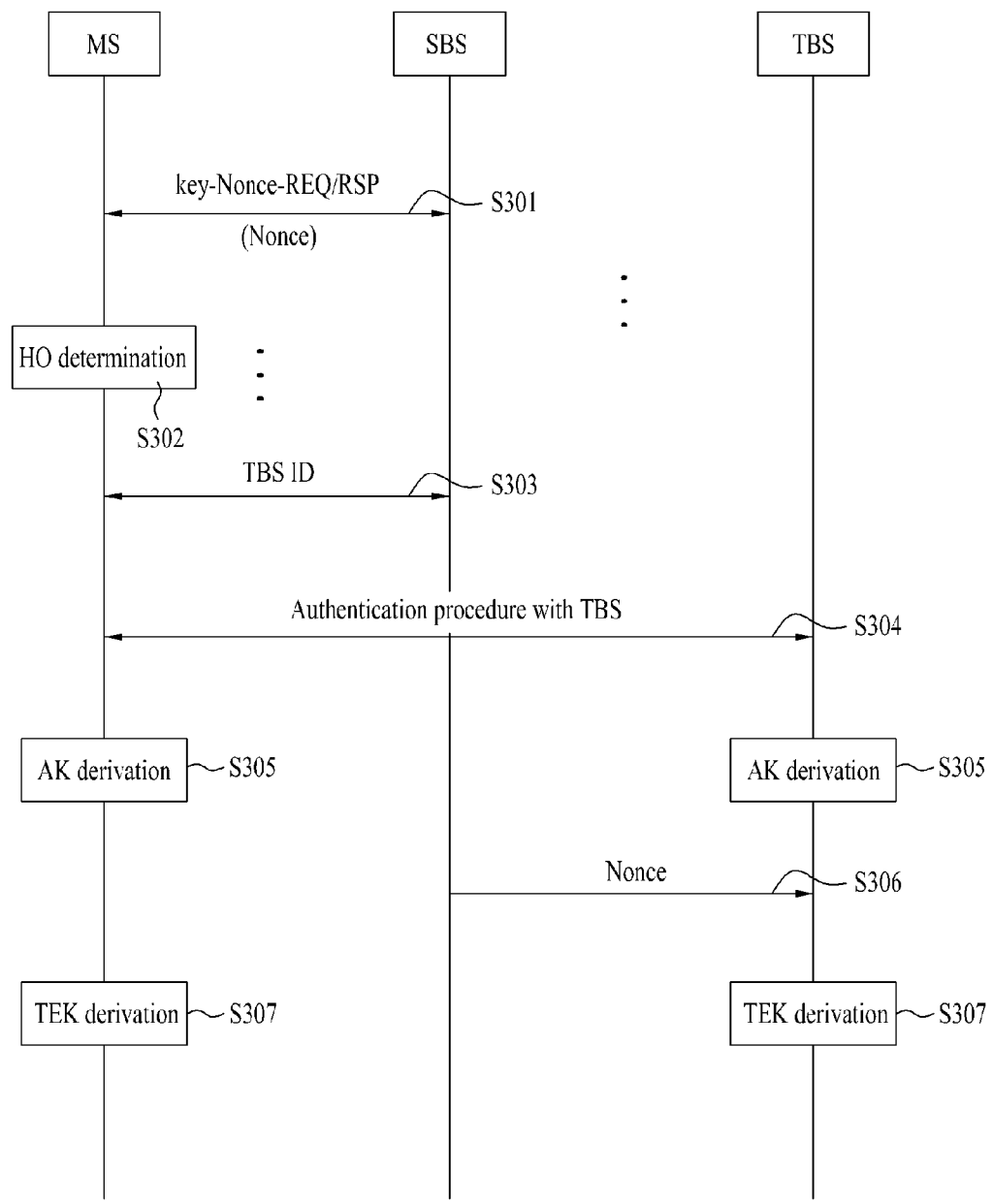
FIG. 3 is a diagram illustrating a method of updating a TEK during handover in accordance with one embodiment of the present invention.

FIG. 3 is a diagram illustrating a method of updating a TEK during handover in accordance with one embodiment of the present invention.

The serving base station (SBS) receives a key nonce request (Key-Nonce-REQ) message from the mobile station (MS), and transmits a key nonce response (Key-Nonce-RSP) message to the mobile station (S301), wherein the key nonce

TABLE 6

| Name | Type | Length | Value (Variable-Length) | PHY scope |
|---|---|---|---|---|
| ... | ... | ... | ... | ... |
| HO Process Optimization | 21 | 2 | For each Bit location a value of '0' indicates the associate re-entry management messages shall be required, a value of '1' indicates the re-entry management messages should be omitted.<br>Bit #0: Omit SBC-REQ management messages during current re-entry processing<br>(Bit #1, Bit #2) = (0, 0): Performed re-authentication and SA-TEK 3-way handshake. BS addition, the RNG-RSP message does not include SA-TEK-Response message. In addition, the RNG-RSP message does not include SA-TEK-Update TLV or SA Challenge Tuple TLV.<br>(Bit #1, Bit #2) = (0, 1): Reserved<br>(Bit #1, Bit #2) = (1, 0): In this case, Option A or B is recommended.<br>Option A) SA-TEK-Update TLV is included in the RNG-RSP message. In this case, SA-TEK 3-way handshake is avoided and SA Challenge Tuple TLV shall not be included in the RNG-RSP message.<br>Option B) SA-TEK-Update TLV or SA Challenge Tuple TLV is included in the RNG-RSP message. TEKs are generated using Nonces. In this case, the TEK encryption algorithm shall be used to protect "TEK Nonces".<br>Option C) SA-TEK-Update TLV is included in a SA-TEK-Response message. In this case, SA-TEK-3-Way handshake is performed with SA Channel Tuple TLV included in the RNG-RSP message.<br>(Bit #1, Bit #2) = (1, 1): Re-authentication and SA-TEK 3-way handshake is not performed. The RNG-RSP message does not included SA-TEK-Update TLV nor SA Challenge Tuple TLV. All the TEKs received form the serving BS are reused. | |
| ... | ... | ... | ... | ... |

Table 6 illustrates an example of a handover process optimization TLV field. The handover process optimization TLV field can be included in the RNG-RSP message. Referring to Table 6, if the handover process optimization TLV field (Bit #1, Bit #2) is set to (1,0), an option for calculating a TEK using Nonce shared between the mobile station and the base station can be added to the SA-TEK-Update TLV.

For example, option A is as follows. If the SA-TEK-Update TLV is included in the ranging response (RNG-RSP) message, SA-TEK 3-way Handshake is not performed and SA challenge Tuple TLV is not included in the ranging response message. In this case, the TEK can be generated using Nonce.

Option B is as follows. If the SA-TEK-Update TLV or SA challenge Tuple TLV is not included in the ranging response (RNG-RSP) message, the TEK can be generated using Nonce. In this case, a TEK encryption algorithm can be used request message requests information required for TEK update, and the key nonce response message includes Nonce.

In step S301, the key nonce request message has the same format as that of the key request message. The key nonce response message has the same format as that of the ky reply message, and includes TEK nonce information encrypted with KEK instead of TEK parameter.

The following Table 7 illustrates an example of the key nonce request (Key-Nonce-Request) message format.

TABLE 7

| Attribute | Contents |
|---|---|
| Key Sequence Number | AK sequence Number |

TABLE 7-continued

| Attribute | Contents |
| --- | --- |
| SAID | Security Association ID |
| HMAC/CMAC Digest | Message Digest Calculated using AK |

Referring to Table 7, the key nonce request message can include AK sequence number, security association identifier (SAID), and HMAC/CMAC digest field.

The following Table 8 illustrates an example of a key nonce reply (key-Nonce-Reply) message attribute.

TABLE 8

| Attribute | Contents |
| --- | --- |
| Key Sequence Number | AK sequence Number |
| SAID | Security Association ID |
| Old-TEK-Nonces | Older generation of TEK-Nonce relevant to SAID |
| New-TEK-Nonces | Newer generation of TEK-Nonce relevant to SAID |
| HMAC/CMAC Digest | Message Digest Calculated using AK |

Referring to Table 8, the key nonce reply message can include AK sequence number, security association identifier (SAID), new TEK nonce, old TEK nonce, and HMAC/CMAC digest field. The new TEK nonce field means a nonce used to generate a new TEK in relevant to SAID, and the old TEK nonce field means a nonce used to generate an old TEK in relevant to SAID. The old/new TEK nonces are old/new TEKS of 802.16 and are mapped with each other one to one.

The following Table 9 illustrates an example of a nonce used in the embodiments of the present invention.

TABLE 9

| Type | Length | Value |
| --- | --- | --- |
| ?? | 4-16 | Nonce to derive TEK |

In Table 9, the nonce is used in the mobile station and the base station to generate a TEK.

The following Table 10 illustrates an example of a TEK nonce field used in the embodiments of the present invention.

TABLE 10

| Type | Length | Value |
| --- | --- | --- |
| ?? | variable | The compound field contains the TEK-Nonce Subattributes |

The following Table 11 illustrates an example of sub-attributes of a TEK nonce field used in the embodiments of the present invention.

TABLE 11

| Sub-Attribute | Contents |
| --- | --- |
| Nonce | 128-bit nonce to generate new TEK, GTEK |
| TEK sequence Number | TEK sequence number |
| TEK lifetime | TEK remaining lifetime |

Referring Table 11, the TEK-Nonces field is a compound attribute comprised of a series of sub-attributes, and means all security parameters relevant to TEK generation of specific SAID. Also, the TEK-Nonces field can include a nonce for generating a TEK, a TEK sequence number, and a TEK lifetime field. Each of the TEK sequence number and the TEK lifetime field includes a sequence number and lifetime of NONCE used to generate a TEK. Accordingly, the NONCE sequence number increases by 1 (modulo 4) whenever new NONCE is allocated, and can be used for EKS.

Referring to the TEK nonce sub-attribute of Table 11, nonce can be refreshed in accordance with TEK interval. Namely, the key nonce response/request messages are exchanged between the base station and the mobile station whenever a TEK update timer (for example, TEK refresh timer) expires, whereby new NONCE is transferred from the base station to the mobile station.

Referring to FIG. 3 again, the mobile station (MS) can determine whether to perform handoff (HO) as a radio condition with the serving base station (SBS) is changed. Of course, the serving base station may also determine whether to perform handoff (S302).

If the mobile station determines to perform handoff, the mobile station transmits a handover request message (MOB_MSHO-REQ) to the serving base station, and the serving base station transmits a handover response message (for example, MOB_BSHO-RSP), which includes target base station identifier (TBS ID), to the mobile station (S303).

The mobile station can perform an authentication procedure with the target base station to perform handoff (S304).

If authentication is successfully performed in step S304, the mobile station can acquire security parameters, i.e., PAK (Pre-Authorization Key), PMK (Pairwise Master Key) and PMK2(Pairwise Master Key2) parameters, from the target base station.

The mobile station and the target base station can generate an authentication key (AK) using security parameters (PAK, PMK and/or PMK2) acquired by the authentication procedure, mobile station identifier, and/or base station identifier (S305).

The serving base station can transmit Nonce, which is transmitted to the mobile station in step S301, to the target base station (S306). According to one embodiment of the present invention, although the target base station receives Nonce after generating AK, the target base station may receive Nonce from the serving base station before generating AK. Namely, although the step S306 is performed after the step S305, the step S306 can be performed before the step S305 in accordance with user's requirements or channel status. Alternatively, the serving base station may transmit Nonce to the target base station as soon as handover with the mobile station is determined or handover is requested from the mobile station. This is limited to the case where the lifetime of Nonce does not expire.

The mobile station can generate a TEK using Nonce previously received from the serving base station and new AK. Also, the target base station can generate a TEK using AK acquired by the authentication procedure with the mobile station and Nonce received from the serving base station (S307).

In the step S307, the mobile station and the target base station can generate a TEK using an increased TEK counter (e.g. Key counter) value. The TEK counter increases whenever handoff occurs, and increases or is reset whenever Nonce is refreshed. Namely, the traffic encryption key counter increases whenever the TEK is updated.

Figure 4:
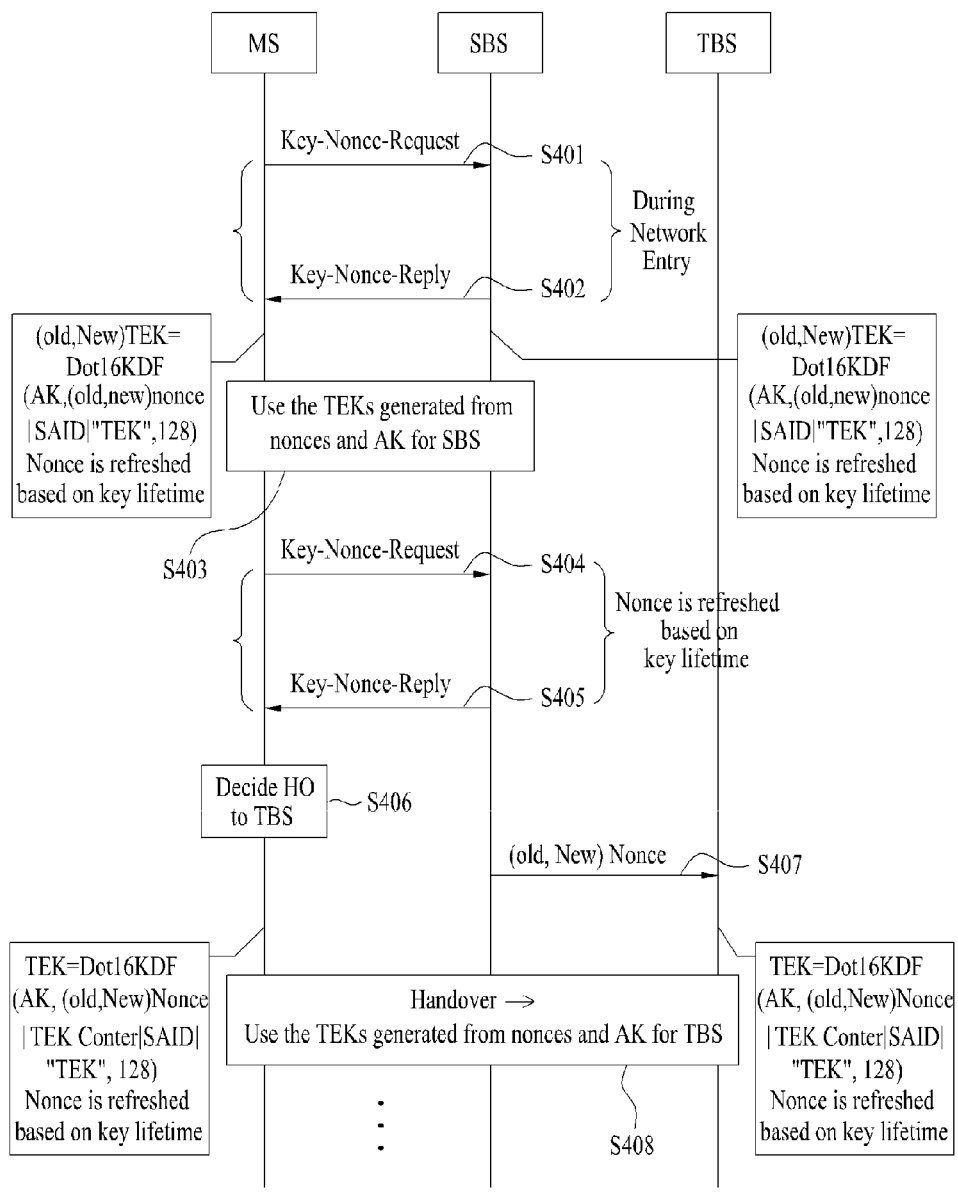
FIG. 4 is a diagram illustrating a method of generating and updating a TEK during handoff in another embodiment of the present invention.

FIG. 4 is a diagram illustrating a method of generating and updating a TEK during handoff in another embodiment of the present invention.

Another embodiment of the present invention discloses a method of generating a TEK to be used by a target base station using AK, Nonce, and TEK counter, in a mobile station which performs handoff, wherein the AK, Nonce, and TEK counter are to be used by the target base station.

The TEK counter is included in each of network nodes (for example, mobile station and/or base station). The TEK counter increases whenever handoff occurs, and increases or is reset whenever Nonce is refreshed. According to another embodiment of the present invention, the TEK counter is not only used in the procedure of generating a TEK but also used in the procedure of updating a TEK, whereby the same TEK can be prevented from being generated.

Also, this TEK counter can equally be applied to the case where the mobile station performs handoff to the serving base station as well as the case where the mobile station performs handoff to the target base station. Namely, if handoff is performed from the serving base station to the target base station and then handoff is performed to the serving base station again, it is assured that the TEK used in the serving base station is different from that used after handoff is performed to the serving base station. At this time, the TEK counter may have various sizes, preferably a size of 16 bits.

Referring to FIG. 4, the mobile station (MS) can request nonce used in the serving base station by transmitting a key nonce request (Key-Nonce-Request) message to the serving base station during a network entry procedure or a key update procedure. At this time, the message described in Table 7 can be used as the key nonce request message (S401).

The serving base station (SBS) transmits a key nonce reply (Key-Nonce-Reply) message to the mobile station (MS), wherein the key nonce reply message includes a nonce value. At this time, the message described in Table 8 can be used as the key nonce reply message. Accordingly, information of Nonce encrypted with KEK, TEK sequence number, and TEK lifetime can be included in the key nonce reply message (S402). As described above, each of the TEK sequence number and the TEK lifetime field can include a sequence number and lifetime of NONCE used to update the TEK.

The mobile station and the serving base station can generate an authentication key (AK) through the authentication procedure. Namely, the mobile station and the serving base station can respectively generate a TEK using nonce (i.e. old, new nonce), AK, and SAID (S403).

In the step S403, the mobile station and the serving base station can respectively generate a TEK using the method of generating a TEK, which is described with reference to the Equation 1. At this time, the TEKs managed by the mobile station and the serving base station are used in accordance with their lifetime.

The TEK generated in the mobile station should be updated before the TEK lifetime included in the key nonce reply message received from the serving base station expires. Accordingly, the mobile station can transmit a key nonce request message requesting new nonce to the serving base station, so as to update the TEK before the TEK lifetime expires (S404).

The serving base station can transmit a key nonce reply message to the mobile station in response to the key nonce request message, wherein the key nonce reply message includes new nonce encrypted with KEK, TEK sequence number and new TEK lifetime parameters (S405). Each of the TEK sequence number and the TEK lifetime field can include a sequence number and lifetime of NONCE used to update the TEK.

As a communication status to which the mobile station and the serving base station belong is changed, the mobile station can determine to perform handoff to the target base station (TBS). According to another embodiment of the present invention, the serving base station may determine handoff without request of the mobile station in accordance with user's requirements or communication status (S406).

If handoff is determined, the serving base station transmits nonce values (old nonce and new nonce), which are recently transmitted to the mobile station, to the target base station (S407). The nonce values recently transmitted to the mobile station mean nonces used to generate a TEK used between the serving base station and the mobile station before handoff is performed. Of course, this is limited to the case where the nonce lifetime does not expire.

If the mobile station or the base station determines handoff, the mobile station and the target base station can respectively generate AK before performing handoff. For example, the mobile station and the target base station can generate an AK using target base station identifier (TBS ID) and security parameters shared by them. Also, the mobile station and the target base station can generate a TEK using AK, nonce, increased TEK counter value, and SAID (S408).

The following Equation 2 represents an example of a method of generating a TEK, which is used in accordance with another embodiment of the present invention.

[Equation 2]

$$(Old,New)TEK = Dot16KDF(AK, (Old,New) Nonce | TEK\ Counter | SAID | \text{``TEK''}, 128)$$

Referring to the Equation 2, it is noted that the TEK counter is used unlike the Equation 1. Although the Equation 2 may be used in the procedure of generating a TEK during initial network entry as described in the Equation 1, the Equation 2 is preferably used in the procedure of updating a TEK. In the Equation 2, if the TEK counter is set to a null value, the same effect as that of the Equation 1 can be obtained.

Figure 5:
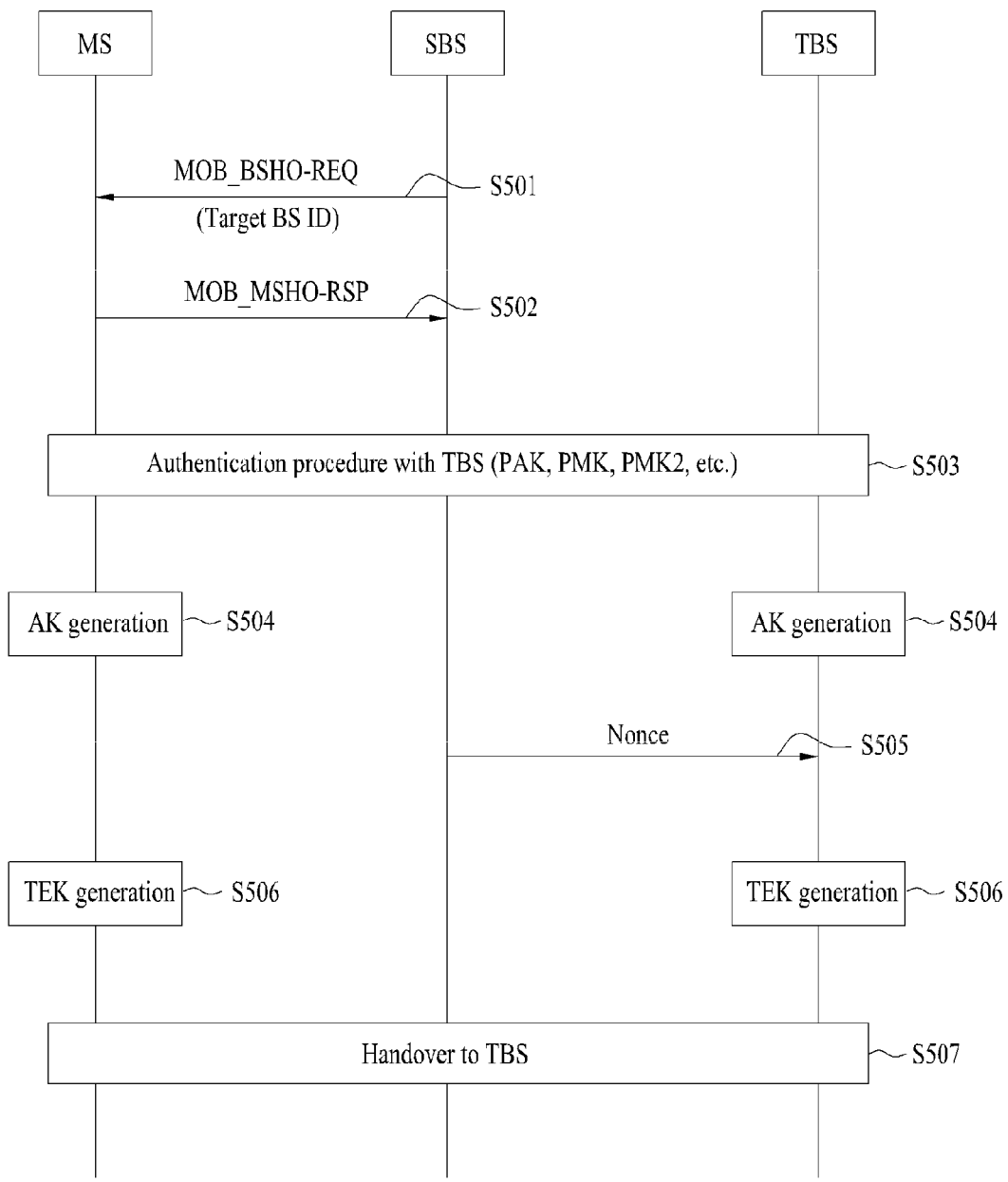
FIG. 5 is a diagram illustrating a method of generating and updating a TEK in another embodiment of the present invention.

FIG. 5 is a diagram illustrating a method of generating and updating a TEK in another embodiment of the present invention.

As a communication status to which the mobile station (MS) and the serving base station (SBS) belong is changed, handoff may be required. In FIG. 5, it is assumed that the serving base station determines handoff without request of the mobile station. Accordingly, the serving base station can transmit a handoff request message (MOB_BSHO-REQ) for requesting handoff to the mobile station. At this time, the serving base station can transmit target base station identifier (TBS ID) for handoff to the mobile station together with the handover request message (S501).

The mobile station can transmit a handoff response message (MOB_MSHO-RSP) to the serving base station in response to the handoff request message. Alternatively, the mobile station can transmit a handover indication message (MOB_MSHO-IND) message to the serving base station in response to the handoff request message in addition to the handoff response message (S502).

If handoff is determined, the mobile station can perform an authentication procedure with the target base station. The mobile station can acquire security parameters (for example, PAK, PMK and/or PMK2) during the authentication procedure, wherein the security parameters are used in the target base station (S503).

The mobile station can generate an AK using target base station identifier and security parameters. The target base station can also generate an AK using information (for example, MAC address of mobile station) acquired during the authentication procedure with the mobile station. At this time, the AK can be generated in accordance with the method described in Table 1 (S504).

Since handoff has been determined, the serving base station can transmit a Nonce for generating a TEK to the target base station. Since the TEK survives for the lifetime, it is preferable that the serving base station transmits a nonce, which is recently transmitted to the mobile station, to the target base station (S505). As described above, the nonce means one recently used to generate a TEK by the serving base station and the mobile station before handoff is performed. Of course, this is limited to the case where the nonce lifetime does not expire.

The mobile station can generate a TEK using the AK generated in step S504, nonce, and increased TEK counter value. The target base station can also generate a TEK using the AK, nonce, and increased TEK counter value. However, in the embodiments of the present invention, it is preferable that the TEK is generated using the AK, nonce, increased TEK counter value, and SAID. This is because that TEK update differentiated for each security association can be performed as SAID is used.

The mobile station performs handoff to the target base station, and receives a data service with security without a separate TEK exchange procedure with the target base station (S507).

The method described with reference to FIG. 5 can be used independently, and can be replaced with the steps S406 to S408 of FIG. 4.

The embodiments of the present invention disclose various methods of supporting fast TEK update to a mobile station which performs handoff. Accordingly, the target base station and the mobile station can receive a seamless service by using the TEK previously generated before handoff is performed. The serving base station transfers information required for TEK generation to the target base station before the mobile station completes handoff to the target base station, whereby the target base station can generate the same TEK as that of the mobile station as far as the TEK lifetime does not expire. This is because that the serving base station and the target base station use the same NONCE to generate a TEK.

In the embodiments of the present invention, latency required for new TEK update during handoff can be reduced through efficient TEK generation. In view of use of radio resources, since nonce for calculating a TEK is previously shared between the mobile station and the target base station when a radio wave condition is good, the time required to establish a new TEK may not affect handoff latency. Also, in the embodiments of the present invention, the ranging response message (RNG-RSP) is not required for TEK update. Namely, TEK update can be performed without OTA message exchange between the target base station and the mobile station, and the mobile station does not need to wait for the ranging response message (RNG-RSP) for TEK update. Accordingly, efficient data communication can be performed.

In the embodiments of the present invention, a method of generating a TEK based on an authentication key (AK) and NONCE can be used. If re-authentication of the mobile station occurs, the AK can be changed. At this time, the TEK can be changed together as the AK is changed. However, even though new TEK is generated due to change of the AK, the existing AK and the existing TEK may be maintained until the lifetime of the existing TEK expires. The existing AK and the existing TEK may be deleted by the mobile station and the base station at the time when new TEK is generated due to the change of the AK.

New TEK and old TEK used in the embodiments of the present invention represent TEKs generated when the mobile station performs initial network entry, location update, handoff, or key update.

Figure 6:
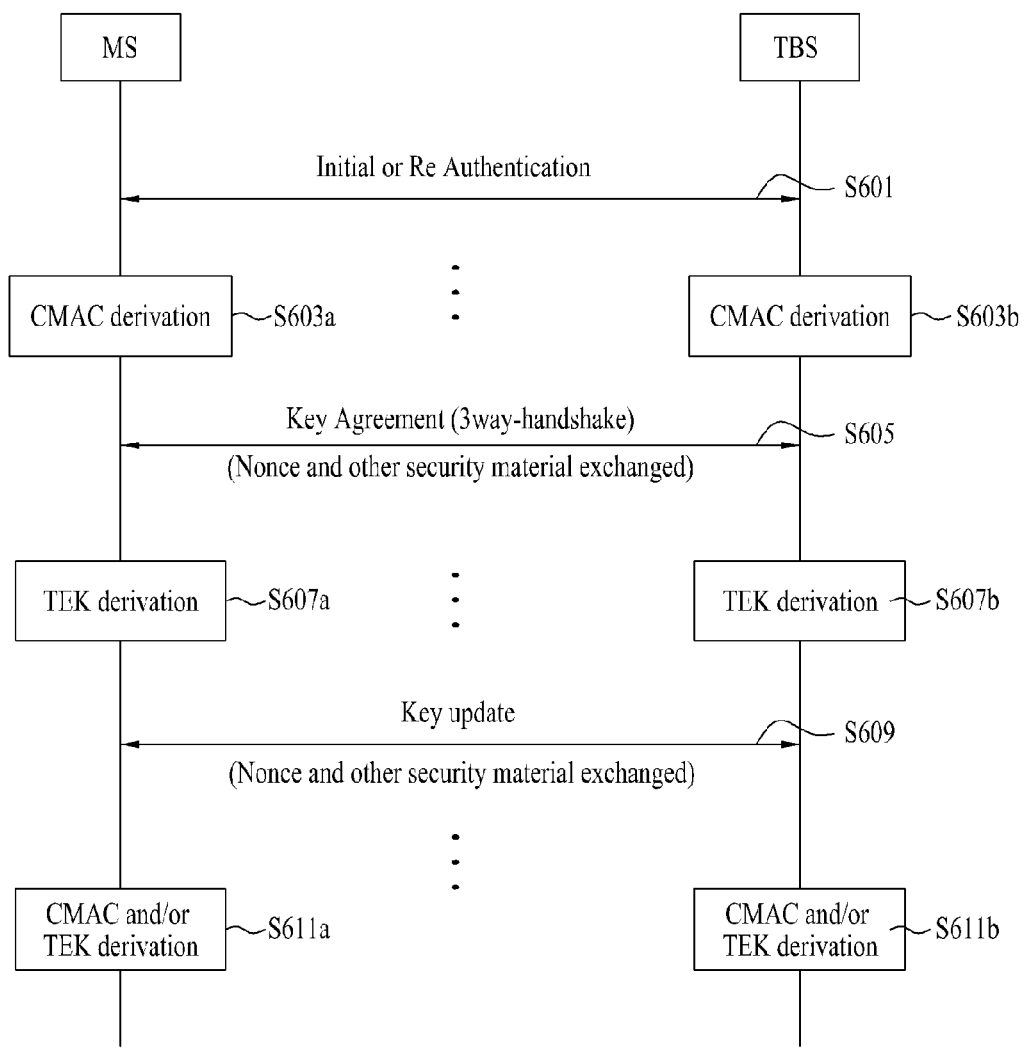
FIG. 6 is a diagram illustrating a method of exchanging encryption key information in another embodiment of the present invention.

FIG. 6 is a diagram illustrating a method of exchanging encryption key information in another embodiment of the present invention.

Referring to FIG. 6, the mobile station performs an initial authentication or re-authentication procedure with the base station (S601).

In the initial authentication or re-authentication procedure of step S601, a pair-wise master key (PMK) can be derived from a master session key (MSK). The MSK is generated by AAA server and then transferred to the base station. The base station can share the MSK with the mobile station by transmitting the MSK to the mobile station. Also, the mobile station and the base station can share security association identifier (SAID).

The base station and/or the mobile station can derive an authentication key (AK) using the PMK. Also, the base station and/or the mobile station can derivate a cipher-based message authentication code (CMAC) key using the AK (S603a and S603b).

In the step S603, the CMAC key can be generated as expressed by the following Equation 3.

[Equation 3]

CMAC key=Dot16KDF(AK|key count|SAID|"CMAC",xxx)

Referring to Equation 3, the CMAC key can be generated using at least one of security association identifier (SAID) relevant to control plane/management signaling, key count (or, TEK counter), and AK.

The mobile station and the base station acquire the AK after completing the authentication or re-authentication procedure, and perform a key agreement (for example, 3 Way-Handshaking) procedure. At this time, the mobile station and the base station exchange Nonce and other security materials through the key agreement procedure (3 way-handshaking) (S605).

At this time, Nonce is generated by the base station and distributed to the mobile station. In this case, as described above, the Nonce is encrypted with KEK by one of TEK encryption algorithms of 802.16e. This is the same as that the TEK is encrypted with the KEK and then transferred from the base station to the mobile station in the 802.16e.

The security materials exchanged in the step S605 include key count, base station identifier (BS ID), and MAC address of the mobile station (MS MAC address). In the embodiments of the present invention, the mobile station and the base station exchange a Nonce value for generating a TEK without exchanging the TEK itself.

The mobile station and the base station can generate a TEK using nonce and security materials exchanged through the key agreement (e.g. 3 way-handshaking) procedure. That is, the mobile station and the base station can derive the TEK by feeding identity parameters into a key derivation function. (S607a and S607b). As described above, the key count used for TEK generation/update should be maintained separately for TEK generation and update. Namely, if more than one TEK is created for an SA, separate key counts are maintained for each TEK.

The following Equation 4 represents one of function of deriving a TEK using nonce and security materials.

[Equation 4]

(Old,New)TEK=Dot16KDF(AK,(Old,New) Nonce|KEY counter|SAID|BS ID|MS MAC Address|"TEK",128)

Referring to Equation 4, the mobile station and the base station can derive a TEK using at least one of nonce, key counter value (i.e. KEY_COUNT), security association ID (SAID), and BS ID and MS MAC address. The key counter value can be referred to as a TEK counter value (i.e. TEK_COUNT).

Each of the TEKs maintained by the mobile station and the base station can have a predetermined lifetime. Namely, if a predetermined lifetime passes, the mobile station and the base station need to update the TEKs. In this case, the mobile station and the base station can perform the key update procedure. The mobile station and the base station can exchange a new nonce value encrypted with a KEK and other security materials through the key update procedure, wherein the KEK is to update a security key. Key request/reply messages are used for the key update procedure as key exchange procedure (S609).

The mobile station and/or the base station update (or, derive) the CMAC key and/or the TEK using the security materials exchanged in the step S609 (S611a and S611b).

In case of the steps S611a and S611b, since different parameters are used for TEK update and CMAC key update as described above, TEK update and CMAC key update are not performed at the same time. Namely, the CMAC key and the TEK are simultaneously updated only if the mobile station and the base station share the same key count parameter or the AK is changed as a result of authentication (or re-authentication), etc.

Figure 7:
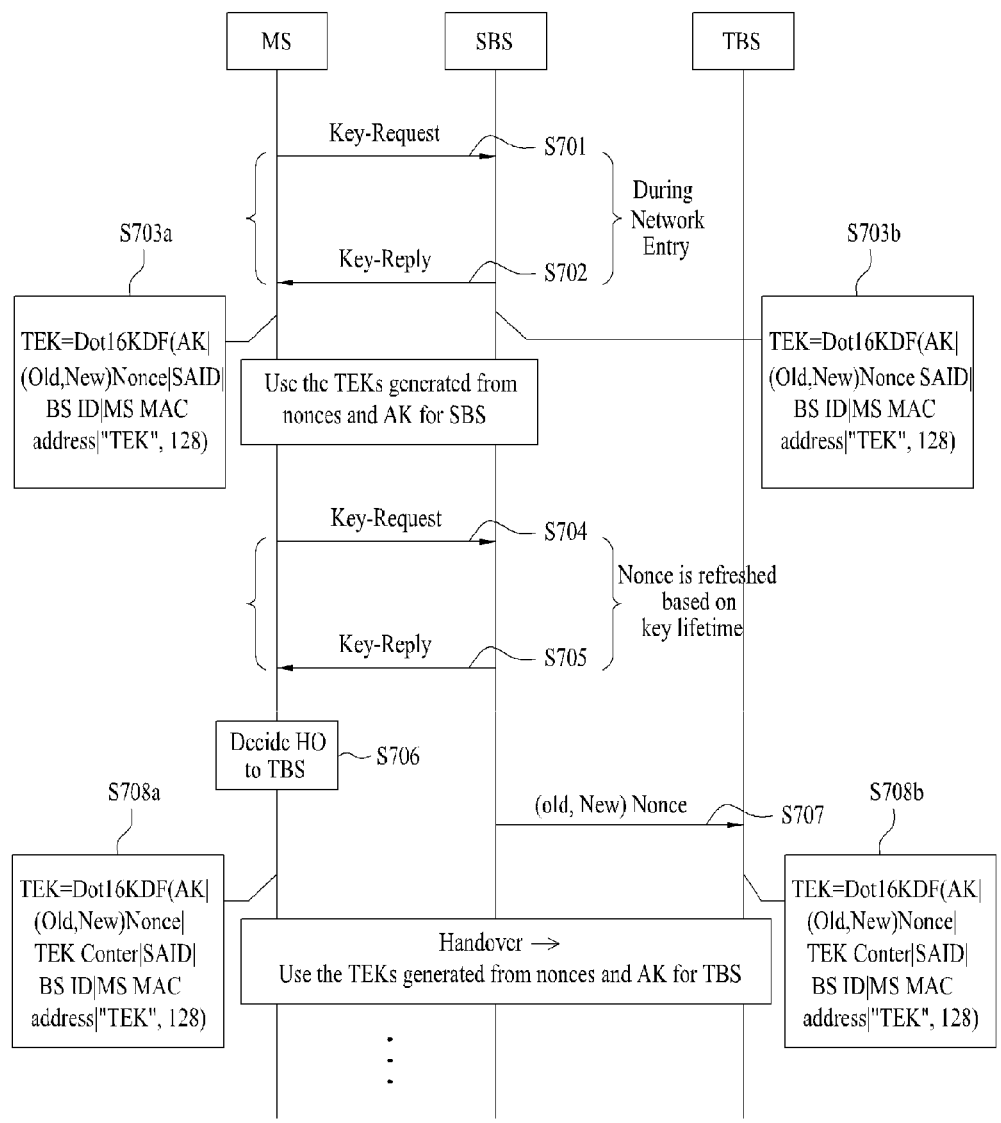
FIG. 7 is a diagram illustrating a method of generating and updating a TEK in another embodiment of the present invention.

FIG. 7 is a diagram illustrating a method of generating and updating a TEK in another embodiment of the present invention. In another embodiment of the present invention, a mobile station which performs handoff can previously derives a TEK used in a target base station by using AK, (old, new) Nonce, TEK counter, SAID, BSID, MS MAC address, which will be used in the target base station.

Technical spirits of FIG. 7 are similar to those of FIG. 4. Accordingly, parts of FIG. 7 different from those of FIG. 4 will be described. The description of FIG. 4 will be used to refer to the other parts which will not be described in FIG. 7. Also, in the embodiments of the present invention, a key counter value or a key count value can be used as the TEK counter value.

Referring to FIG. 7, the mobile station (MS) transmits a key request (Key-Request) message to the serving base station (SBS) during network entry procedure to request nonce used in the serving base station. At this time, the message described in FIG. 7 can be used as the key request message described in table 7 (S701).

The serving base station (SBS) transmits a key reply (Key-Reply) message to the mobile station (MS) in response to the key request message, wherein the key reply message includes a nonce value encrypted with the KEK. At this time, the message described in Table 8 can be used as the key reply message. Namely, information of nonce encrypted with KEK, TEK sequence number, and TEK lifetime can be included in the key reply message (S702). As described above, each of the TEK sequence number and the TEK lifetime field can include a sequence number and lifetime of NONCE used to update the TEK.

The mobile station and the serving base station can generate an authentication key (AK) through the authentication procedure. Accordingly, the mobile station (MS) and the serving base station (SBS) can respectively generate a TEK using at least one of nonce (old nonce and new nonce), AK, MAC address of the mobile station (MS MAC address), base station identifier (BS ID), and SAID (S703a and S703b).

In the steps S703a and S703b, the mobile station and the serving base station can respectively generate a TEK using one of the Equation 1, the Equation 2, and the Equation 4. At this time, since the TEKs have their respective lifetime, the TEKs managed by the mobile station and the serving base station can be used as much as their lifetime.

The TEK generated in the mobile station should be updated before the TEK lifetime included in the key reply message received from the serving base station expires. Accordingly, the mobile station can transmit a key request message to the serving base station to update the TEK before the TEK lifetime expires. This is a procedure for receiving new NONCE for TEK update from the base station (S704).

The serving base station can transmit a key reply message to the mobile station, wherein the key reply message includes new nonce, TEK sequence number and new TEK lifetime parameters. Each of the TEK sequence number and the TEK lifetime parameter can include a sequence number and lifetime of NONCE used to update the TEK (S705).

The procedures described in the steps S701 to S705 can be performed using the method of generating and updating a TEK, which is described with reference to FIG. 1.

As a communication status to which the mobile station and the serving base station belong is changed, the mobile station can determine to perform handoff to the target base station (TBS). According to another embodiment of the present invention, although the mobile station determines handoff, the serving base station may determine handoff in accordance with user's requirements or communication status (S706).

If handoff is determined, the serving base station transmits nonce, which is recently transmitted to the mobile station, to the target base station (S707).

In step S707, the nonce recently transmitted to the mobile station means one most recently used to generate a TEK used by the serving base station and the mobile station before handoff is performed. Of course, this is limited to the case where the nonce lifetime does not expire.

If the mobile station determines handoff, the mobile station can perform a re-authentication procedure (for example, RNG-REQ/RSP exchange) with the target base station. At this time, the mobile station can determine whether the mobile station legally shares the AK with the target base station by verifying a CMAC value added to the RNG-REQ/RSP messages. This AK is newly generated using target base station identifier and other security parameters received from the serving base station. Also, the target base station can generate the same authentication key (AK) as that of the mobile station using information relevant to the mobile station, which is received from the serving base station (SBS), after handover is determined.

Accordingly, the mobile station and the target base station can generate a TEK using target base station identifier (TBS ID) and security parameters. For example, the mobile station and the target base station can update the TEK using at least one of AK, nonce, increased TEK counter value, target base station identifier (TBS ID), MS MAC address, and SAID. At this time, the security parameters can be changed to values updated during a message transmission procedure between the mobile station and the target base station (S708a and S708b).

It is assumed that the mobile station and/or the base station use the Equation 4 to derive a TEK in step S708. At this time, referring to the Equation 4, it is noted that the base station identifier and the TEK counter are used unlike the Equation 1. Although the Equation 4 may be used in the procedure of generating a TEK during initial network entry as described in the Equation 1, the Equation 4 is preferably used in the procedure of updating a TEK. In the Equation 4, if the TEK counter is set to a null value, the same effect as that of the Equation 1 can be obtained.

As another embodiment of the present invention, the mobile station and the base station through which the embodiments of the present invention can be performed will be described with reference to FIG. 3 to FIG. 7.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

What is claimed is:

1. A method of deriving a traffic encryption key (TEK), the method comprising:

obtaining, by a mobile station (MS) from a serving base station (SBS), a nonce for deriving a TEK;

transmitting, by the MS to the SBS, a handover request message;

receiving, by the MS from the SBS, a handover response message comprising a target base station identifier (TBS ID);

obtaining, by the MS, a pair-wise master key (PMK) during an authentication procedure with a target base station (TBS), wherein the PMK is derived from a master session key (MSK);

deriving, by the MS, an authentication key (AK) using the PMK, a medium access control (MAC) address of the MS and the TBS ID;

transmitting, by the SBS to the TBS, the nonce for deriving a new TEK at the TBS;

performing, by the MS, a 3-way handshake procedure with the TBS after the authentication procedure is completed;

deriving, by the MS, the new TEK using the AK, a TEK counter, the nonce and a security association identifier (SAID) before a handover procedure is completed; and deriving, by the TBS, the new TEK using the AK and the nonce, wherein the AK is generated during the authentication procedure.

2. The method of claim 1, further comprising:

obtaining, by the mobile station, a pre-authentication key (PAK) and a pair-wise master key2 (PMK2) during the authentication procedure.

3. The method of claim 1, further comprising:

deriving a cipher-based message authentication code (CMAC) key using the AK.

4. A wireless access system for deriving a traffic encryption key (TEK), the wireless access system comprising:

a mobile station (MS);

a serving base station (SBS); and a target base station (TBS), wherein the MS is configured to:

obtain a nonce from the SBS for deriving a TEK;

transmit a handover request message to the SBS;

receive a handover response message from the SBS, the handover response message comprising a identifier of the TBS (TBS ID);

obtain a pair-wise master key (PMK) during an authentication procedure with the TBS, the PMK derived from a master session key (MSK); and derive an authentication key (AK) using the PMK, a medium access control (MAC) address of the MS and the TBS ID;

wherein the SBS is configured to transmit the nonce for deriving a new TEK at the TBS;

wherein the MS is further configured to:

perform a 3-way handshake procedure with the TBS after the authentication procedure is completed; and derive the new TEK using the AK, a TEK counter, the nonce and a security association identifier (SAID); and wherein the TBS is configured to derive the new TEK using the AK and the nonce, the AK generated during the authentication procedure.

5. The wireless access system of claim 4, wherein the MS is further configured to derive a cipher-based message authentication code (CMAC) key using the AK.

* * * * *